United States Patent
Kim et al.

(10) Patent No.: US 10,563,902 B2
(45) Date of Patent: Feb. 18, 2020

(54) SMART REFRIGERATOR INCLUDING VOICE RECOGNITION

(71) Applicant: LG ELECTRONICS INC., Seoul (KR)

(72) Inventors: Sungyup Kim, Seoul (KR); Jaeyoung Kim, Seoul (KR); Yoonseong Kim, Seoul (KR); Sungyoon Ham, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 15/801,896

(22) Filed: Nov. 2, 2017

(65) Prior Publication Data
US 2018/0120019 A1 May 3, 2018

(30) Foreign Application Priority Data
Nov. 2, 2016 (KR) .................. 10-2016-0145237

(51) Int. Cl.
*F25D 23/02* (2006.01)
*F25D 29/00* (2006.01)
(Continued)

(52) U.S. Cl.
CPC .......... *F25D 23/02* (2013.01); *F25D 29/005* (2013.01); *G06K 9/00288* (2013.01);
(Continued)

(58) Field of Classification Search
CPC .... F25D 23/02; F25D 29/005; F25D 2323/02; F25D 2500/06; F25D 2700/02
See application file for complete search history.

(56) References Cited

U.S. PATENT DOCUMENTS

2002/0178066 A1* 11/2002 Roh .................. G06Q 20/203
                                                  705/22
2014/0169640 A1*  6/2014 Park ................... F25D 29/00
                                                  382/110
(Continued)

FOREIGN PATENT DOCUMENTS

GB          2507929 A  *  5/2014  ............. G01G 19/42
JP       2008210343 A  *  9/2008
(Continued)

OTHER PUBLICATIONS

Korean Office Action dated Dec. 6, 2017 issued in KR Application No. 10-2016-0145237.
(Continued)

*Primary Examiner* — Edward F Landrum
*Assistant Examiner* — Daniel C Comings
(74) *Attorney, Agent, or Firm* — Ked & Associates, LLP (57) ABSTRACT

A refrigerator including a main body having a plurality of storage compartments to store food; a door configured to open and close the main body; a door switch configured to detect an opening and closing of the door; a microphone configured to receive a voice of a user; and a controller configured to recognize the voice of the user input from the microphone and extract shopping goods information, wherein the controller extracts the shopping goods information based on the voice of the user input through the microphone when the door is opened.

14 Claims, 10 Drawing Sheets

(51) Int. Cl.
*G06K 9/00* (2006.01)
*G10L 15/26* (2006.01)

(52) U.S. Cl.
CPC ........ *G10L 15/265* (2013.01); *F25D 2300/00* (2013.01); *F25D 2323/02* (2013.01); *F25D 2400/36* (2013.01); *F25D 2500/06* (2013.01); *F25D 2700/02* (2013.01); *F25D 2700/04* (2013.01)

(56) References Cited

U.S. PATENT DOCUMENTS

2015/0161871 A1* 6/2015 Kim ................... A61B 5/1171
340/539.12
2015/0379601 A1* 12/2015 Ouimet ............. G06Q 30/0613
705/26.41

FOREIGN PATENT DOCUMENTS

| KR | 10-2002-0096632 | 12/2002 | |
| KR | 20080055257 A * | 6/2008 | ............. F25F 11/02 |
| KR | 10-2010-0122157 | 11/2010 | |
| KR | 10-1024501 | 3/2011 | |
| KR | 10-1045965 | 7/2011 | |
| KR | 10-2014-0038862 | 3/2014 | |
| KR | 10-2016-0000931 | 1/2016 | |
| KR | 10-2016-0039244 | 4/2016 | |
| KR | 10-2016-0073046 | 6/2016 | |

OTHER PUBLICATIONS

Korean Office Action dated Nov. 5, 2018 issued in KR Application No. 10-2018-0090630.

* cited by examiner

SMART REFRIGERATOR INCLUDING VOICE RECOGNITION

CROSS-REFERENCE TO RELATED APPLICATION

This application claims priority benefit under 35 U.S.C. § 119 to Korean Application No. 10-2016-0145237, filed on Nov. 2, 2016 in the Korean Intellectual Property Office, whose entire disclosure is hereby incorporated by reference.

BACKGROUND

1. Field

The present disclosure relates to a refrigerator.

2. Background

A refrigerator is an apparatus that allows goods such as food and drinks, for example, to be stored in a fresh state for a long time by cold or cool air supplied to the inside of a storage compartment. The cool air supplied to the inside of the storage compartment may be generated by a heat exchange process of refrigerant. The cool air supplied to the inside of the storage compartment may be uniformly transferred to the inside of the storage compartment by convection so that food or drinks can be stored at a desired temperature.

When a user purchases goods such as foodstuffs or the like that is stored in a refrigerator, the user usually purchases goods based on memory when shopping at an offline shopping mall or grocery store. When food in the refrigerator is managed by the user's memory, duplicate food items may be purchased and required food items may not be purchased.

In addition, even when a user personally writes a memo in order to prevent such a duplicate purchase while checking food, for example stored inside the refrigerator, such a memo may be often be lost when visiting the shopping mall. Accordingly, in the related art, there is a problem in that the purchase of the duplicate goods in the refrigerator may be performed very unreasonably and it is difficult to specify the deficient goods in the refrigerator and to remember it.

BRIEF DESCRIPTION OF THE DRAWINGS

The embodiments will be described in detail with reference to the following drawings in which like reference numerals refer to like elements wherein.

DETAILED DESCRIPTION

Figure 1:
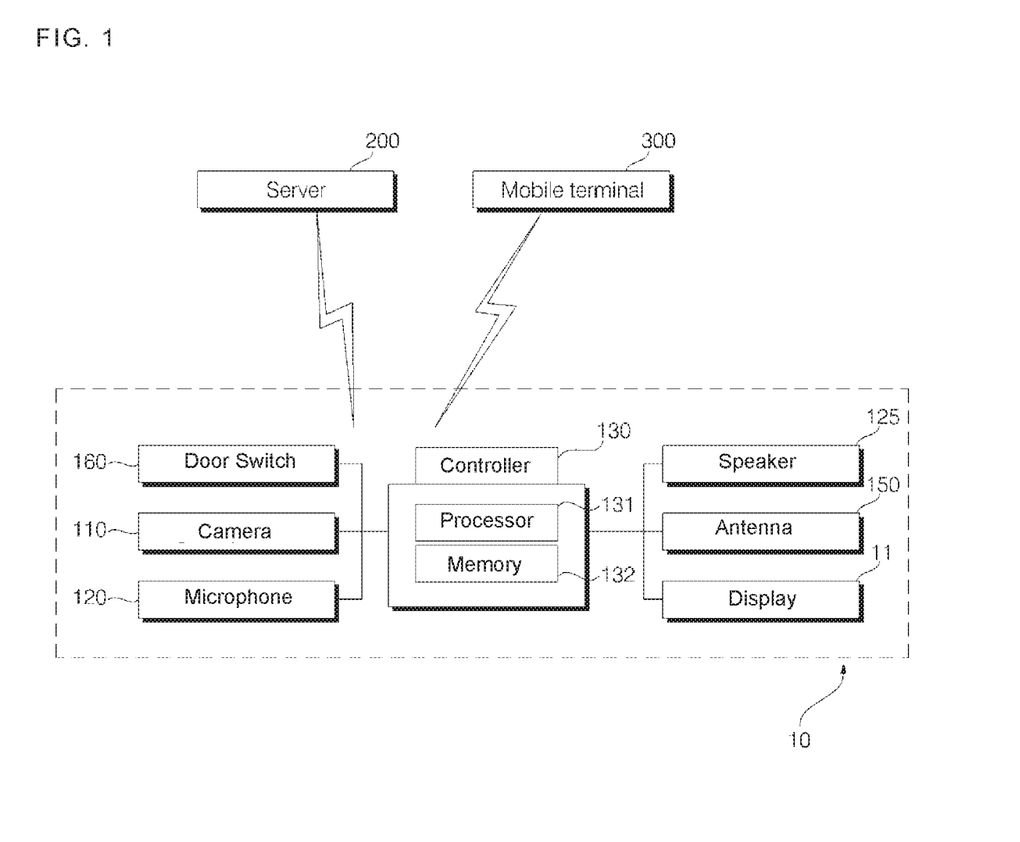
FIG. 1 is a block diagram of a refrigerator according to an embodiment of the present disclosure.
Figure 2:
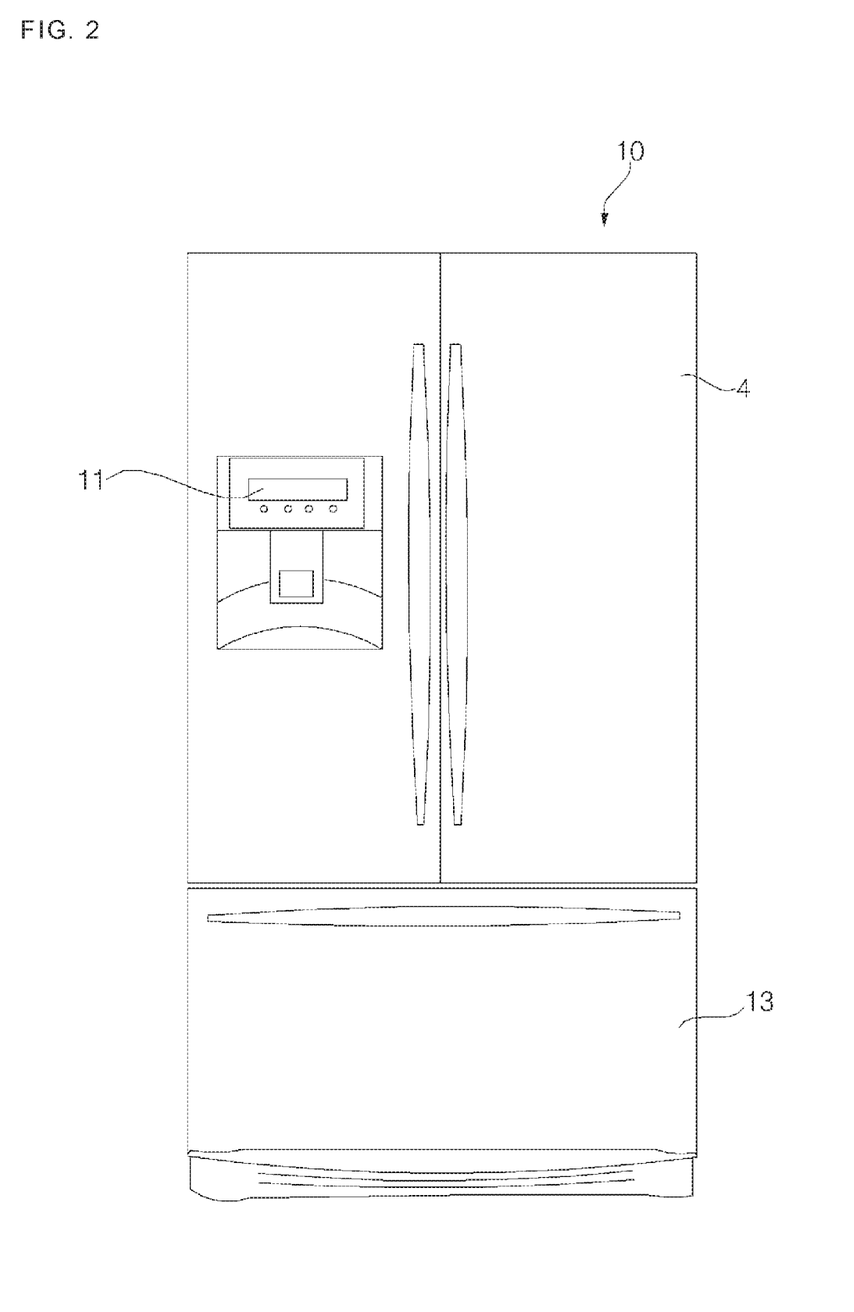
FIG. 2 is a front view of a refrigerator according to an embodiment of the present disclosure.
Figure 3:
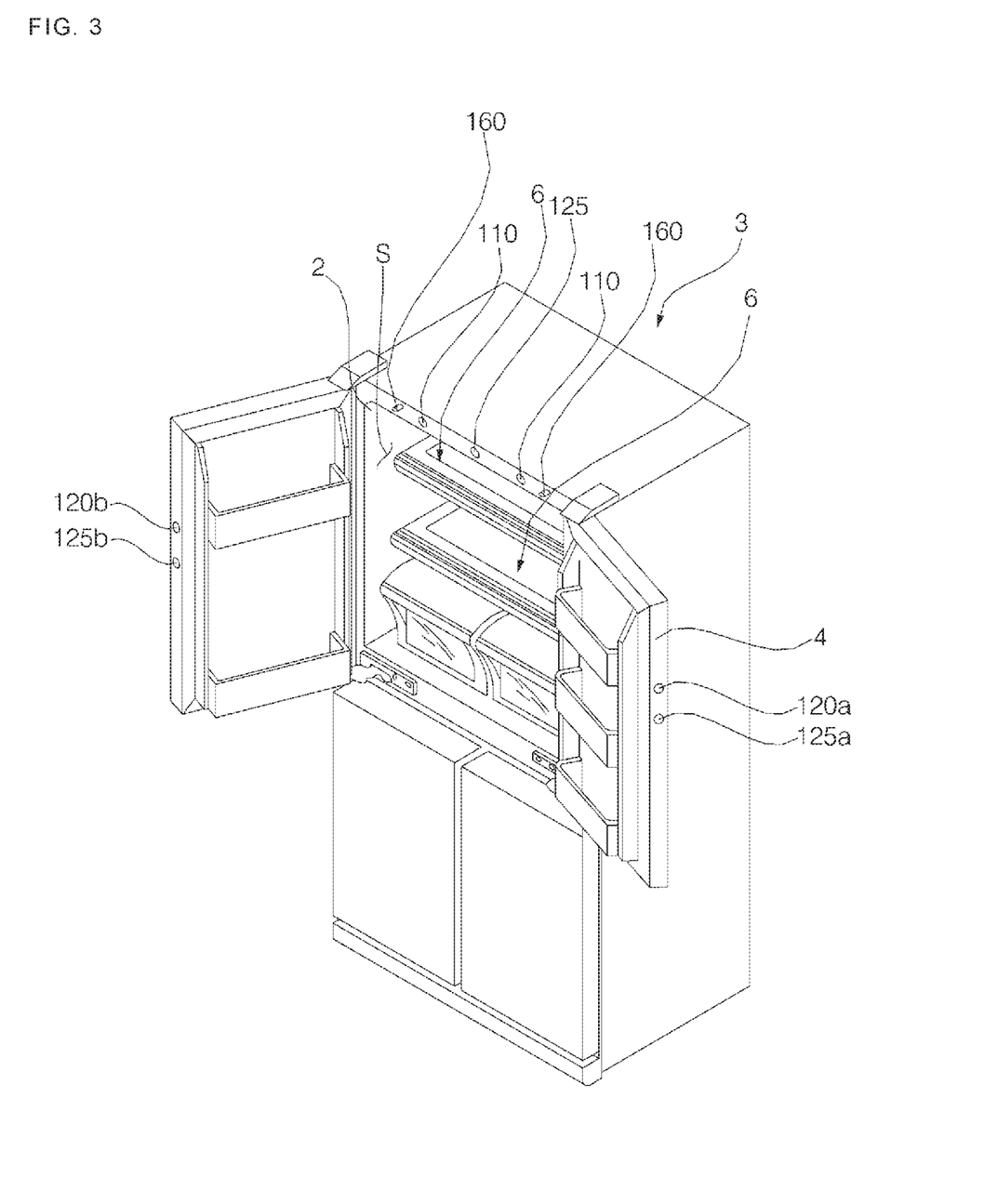
FIG. 3 is a front view of the refrigerator shown in FIG. 1 when a door is opened.

Referring to FIGS. 1-3, the refrigerator according to an embodiment of the present disclosure may include a main body 3 having a plurality of storage compartments to store food, a door 4 that opens and closes the main body 3, a door switch 160 that detects an opening and closing of the door 4, a voice input unit (or microphone) 120 that receives a voice of a user, and a control unit (or controller) 130 that recognizes the voice of the user captured by the microphone 120 and extracts shopping goods information. The refrigerator according to an embodiment may further include a sound output unit (or speaker) 125, an image acquisition unit (or camera) 110, a display unit or display 11, and/or a communication unit (or antenna) 150.

The main body 3 may include at least one storage compartment S. When a plurality of storage compartments S are formed in the main body 3, the plurality of storage compartments S may be partitioned by a barrier. The main body 3 may include an upper storage compartment and a lower storage compartment, or may include a first or left storage compartment and a second or right storage compartment. The main body 3 may include a chilling compartment located on the upper side and a freezing compartment located on the lower side of the chilling compartment. The main body 3 may include an outer case 10 which forms an outer appearance.

Specifically, the storage compartment S may be formed in the main body 3 by an inner case 2. The inner case 2 may be located inside the outer case 10. The main body 3 may include a heat insulating material between the outer case 10 and the inner case 2.

Figure 4:
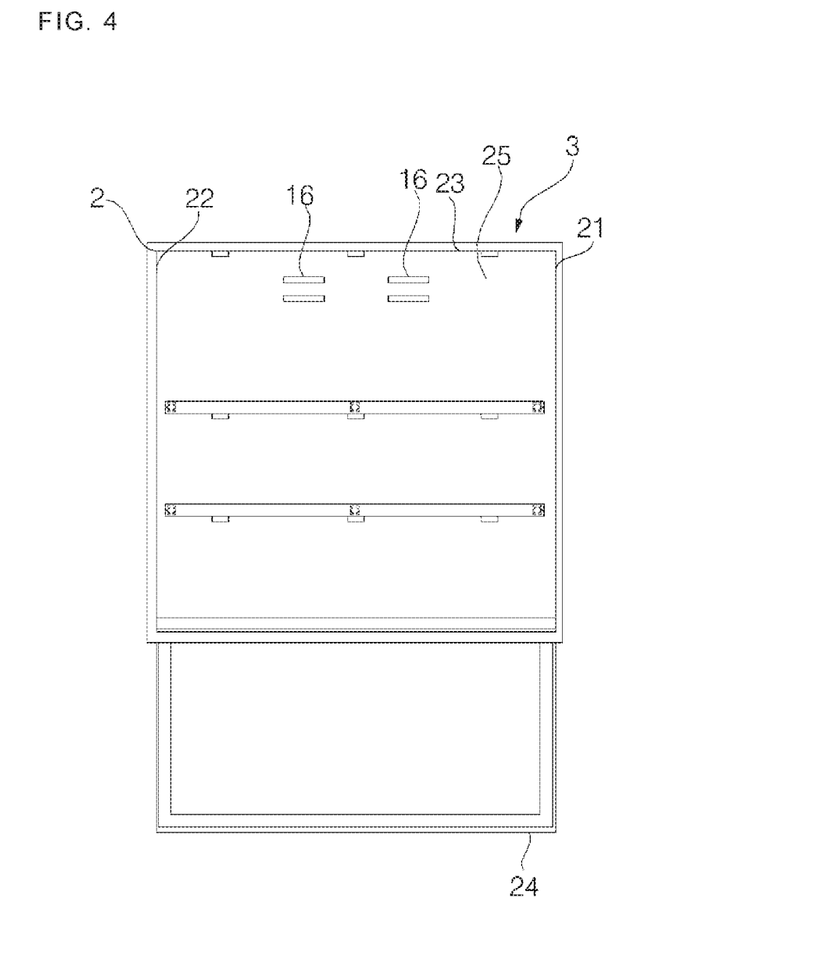
FIG. 4 is a front view of a main body of the refrigerator shown in FIG. 1 excluding a door.

The inner case 2 may have a box shape having an opened front surface. The inner case 2 may include a left plate 21, a right plate 22, an upper plate 23, a lower plate 24, and a rear plate 25.

The main body 3 may include a plurality of storage compartments to store food. The plurality of storage compartments may be partitioned into independent spaces, and spaces connected to each other may be logically separated. Specifically, the plurality of storage portions may be defined by partitioning the storage compartment S of the main body 3 by a shelf 6.

The shelf 6 may be an item on which goods such as food, etc., to be stored in the storage compartment S are placed, and at least one shelf may be located in the storage compartment S to partition the storage compartment S into a plurality of spaces. The detailed structure shall be described later.

The main body 3 may include a cooling device to cool the storage compartment S. The cooling device may include a compressor that compresses a refrigerant, a condenser that condenses the refrigerant compressed in the compressor, an expansion apparatus that expands the refrigerant condensed in the condenser, and an evaporator that evaporates the refrigerant expanded in the expansion apparatus.

The main body 3 may include a storage compartment fan that supplies cool air to the storage compartment S after flowing the cool air through the evaporator. The main body 3 may include a cool air duct that guides the air cooled by the evaporator to the storage compartment S. The cool air duct may include a cool air discharge port 16 through which the cool air may be discharged to the storage compartment S.

A single door 4 may open and close the storage compartment S, or a plurality of doors 4 may open and close the storage compartment S together. In an embodiment, two of the doors 4 may be coupled to the main body 3 so as to rotate with a rotation axis parallel to a vertical direction. The door 4 and the main body 3 may include a door switch 160 that detects the opening and closing of the door 4.

The door switch 160 may detect that the door 4 opens or closes the main body 3 and transmit the detection result to the controller 130. Various known techniques that detect whether the door 4 is open or not may be used for the door switch 160.

The camera 110 may be an apparatus that acquires an image. The camera 110 may include, for example, a digital camera. The camera 110 may include an image sensor and an image processing module. The camera 110 may process still image or video obtained by the image sensor (e.g., CMOS or CCD). The image processing module may process the still image or video obtained through the image sensor to extract necessary information, and may transmit the extracted information to the controller 130 which will be described later. The controller 130 may determine the gender, age, and face of a user, and the access state of the user based on the information acquired by the camera 110.

The camera 110 may extract an image of the user who opens the door 4 and provide the extracted image to the controller 130. The image acquired by the camera 110 may be signal processed in the controller 130.

The camera 110 may be installed at a position such that a surrounding image of the door 4 may be obtained. Specifically, it may be installed on the front surface (the surface facing the rear surface of the door 4) of the main body 3.

The antenna 150 may enable wireless communication between the server 200 and a refrigerator and/or a plurality of refrigerators. In addition, the antenna 150 may be capable of performing wired/wireless communication with a mobile terminal 300. The antenna 150 may transmit information received from the server 200 and/or the mobile terminal to the controller 130 and transmit a control signal of the controller 130 to other refrigerators, the mobile terminal, and/or the server 200.

For example, the antenna 150 may transmit and receive wireless signals with at least one of a base station, an external terminal, and the server 200 on a mobile communication network established according to technical standards or communication method for mobile communication (e.g., Global System for Mobile communication (GSM), Code Division Multiple Access (CDMA), Code Division Multiple Access 2000 (CDMA 2000), Enhanced Voice-Data Optimized or Enhanced Voice-Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like).

For another example, the antenna 150 may transmit and receive wireless signals in a communication network according to wireless Internet technologies. The wireless Internet technologies may include, for example, Wireless LAN (WLAN), Wireless Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 113 may transmit and receive data according to at least one wireless Internet technology in a range including internet technologies not listed above.

The server 200 may include a space to store data such as shopping goods information accumulated in the refrigerator. The server 200 may store a communication address of the mobile terminal 300 of a specific user, a previous shopping list (history) of a specific user, and the like. The server 200 may achieve a wired/wireless communication method with the controller 130. Obviously, the server 200 may include a server 200 that provides a web site of shopping mall, for example.

The display 11 may display an image or text based on the control signal provided by the controller 130. Specifically, the display 11 may display the shopping goods information provided by the controller 130 in the form of an image or a text.

The display 11 may include an interaction layer structure with the touch sensor or may be integrally formed, so that a touch screen may be implemented. Such a touch screen may serve as a user command input unit or input that provides an input interface between the refrigerator and the user, while providing an output interface between the refrigerator and the user.

Thus, as will be described later, when the shopping goods information is displayed on the display 11, the user may input a touch command to the display 11 and transmit an order command to the server 200 of the shopping mall, for example. The disposition position of the display 11 is not limited. It may be provided on the front surface of the door 4 in consideration of the user's convenience of operation.

The microphone 120 may receive the voice of user, process the voice into electrical voice data, and output the voice data to the controller 130. For example, the microphone 120 may include a digital microphone.

The microphone 120 may be provided in the main body 3 and/or the door 4 of the refrigerator. Specifically, the microphone 120 may be provided on the front surface of the main body 3. The microphone 120 provided in the main body 3 may receive the voice of the user when both of two doors 4 are opened. More specifically, the microphone 120 provided in the main body 3 may be located at an upper portion of a center of the main body 3.

The microphone 120 may be arranged on a side surface of the door 4. Specifically, when two doors 4 are provided, two microphones 120*a*, 120*b* may be provided on the side surface of the two doors 4 respectively. At this time, the microphones 120*a*, 120*b* may be provided on the side surfaces of the two doors 4 facing each other. Thus, it may be effective to receive the voice of the user through the microphone 120 provided on the side of the door 4 in the closed state when the user opens one of the two doors 4. When only a single microphone 120 is provided, the microphone 120 may be provided on one side surface of the door 4.

The microphone 120 may include various noise elimination algorithms to eliminate noise generated in the process of receiving an external sound signal. The speaker 125 may output a sound in accordance with the control signal of the controller 130. For example, the speaker 125 may include a receiver, or a buzzer, for example. The speaker 125 may provide information on the refrigerator to the user and may output a sound to eliminate various noises so as to eliminate noise generated in the process of receiving an external sound signal.

Specifically, the speaker 125 may output a certain sound according to a noise signal input from the microphone 120. The controller 130 may transmit a sound source signal to the speaker 125 so as to output a sound having a phase opposite to that of a noise generated in the surroundings of the microphone 120.

The speaker 125 may be provided on the side surface of the door 4. Specifically, when two doors 4 are provided, two speakers 125a, 125b may be provided on the side surface of the two doors 4, respectively. At this time, the speakers 1251, 125b may be provided on the side surfaces facing each other among the side surfaces of the two doors 4. Thus, it may be effective to output a sound to eliminate noise from the speaker 125 provided in the open door 4 while the user's voice is inputted through the microphone 120 provided on the side surface of the closed door 4, when the user opens one of the two doors 4.

The controller 130 may control the overall operation of each configuration of the refrigerator. The controller 130 may recognize the voice of the user input from the microphone 120 to extract the shopping goods information, convert the extracted shopping goods information into various control signals, and output to various electronic devices. In addition, the controller 130 may specify a user through the input voice or image of user. Further, the controller 130 may output a control signal to the server 200 and/or the mobile terminal.

For example, the controller 130 may include a processor 131 that makes logical decisions and a memory 132 that stores data. The processor 131 may be implemented in hardware by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors 130, and an electrical unit for performing other functions.

The controller 130 may be provided in each refrigerator, may be provided in the server 200 connected to the refrigerator by a wire/wireless communication method, or may be provided simultaneously in each refrigerator and the server 200. Various data necessary for controlling the refrigerator may be stored in the memory 132. Specifically, the memory 132 may store the extracted voice/video information of user, the video/voice information of a registered user, the extracted shopping goods information, the communication address of the mobile terminal 300 of the registered user, the address of the server 200 of a registered shopping mall, a voice command, and the like.

Figure 5A:
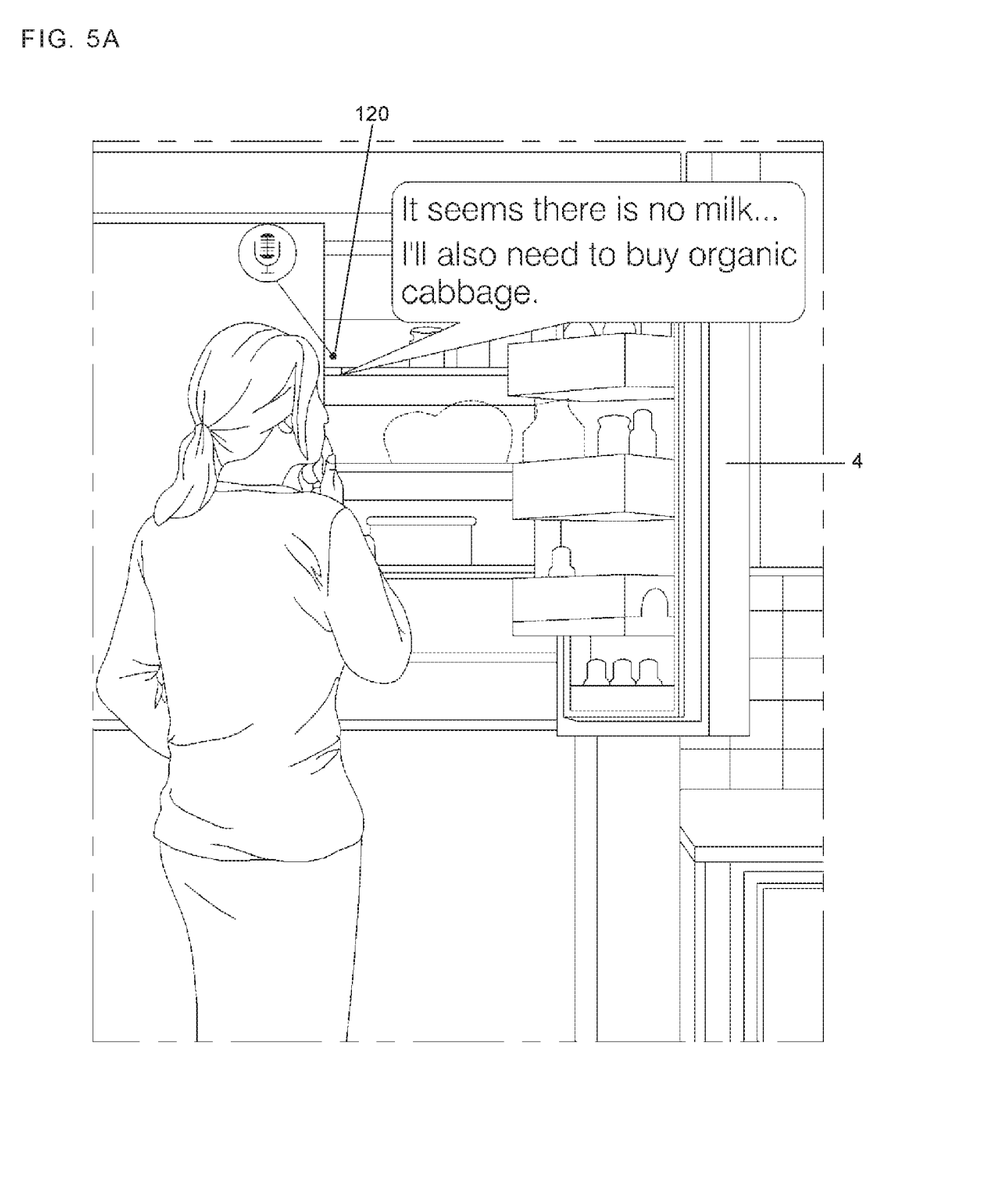
FIG. 5A is an example of an operation of a refrigerator according to an embodiment of the present disclosure.

Hereinafter, an operation method of the refrigerator according to an embodiment of the present invention shall be described. Referring to FIG. 5A, the controller 130 may extract shopping goods information based on a user's voice input through the microphone 120 when the door 4 is opened. The controller 130 may determine opening and closing of the door 4 based on sensing information input from the switch of the door 4. When the opening of the door 4 is detected, the controller 130 may output a control signal which enables the microphone 120 to receive the user's voice.

The controller 130 may extract only the user voice input through the microphone 120 as the shopping goods information only when the door 4 is opened. Here, the method of extracting the user's voice as the shopping goods information may be accomplished to recognize the voice command of the user input through the microphone 120. For example, it may be configured to support both the well known speaker dependent voice recognition technique and the well known speaker independent voice recognition technique.

The speaker dependent voice recognition technique may be a technique that recognizes only a voice command of a user after registering a voice command unique to the user, and may be used to specify the user and specify the mobile terminal 300, and may be used to extract shopping goods information. The speaker independent voice recognition technique may be a technique that recognizes the voice command of the user regardless of the sameness of the user, and this technique may be applied to the extraction of shopping goods information.

In order to accomplish an activation of the extraction of shopping goods information, the controller 130 may perform the activation when the user inputs a specific voice command or may perform the activation when the user touches a display, pushes a physical button, or the like. Specifically, the controller 130 may extract, as the shopping goods information, a voice which is the same as or similar to the voice command for the registered shopping goods information among the voice of the user input by the user in the open state of the door 4.

The controller 130 may output the extracted shopping goods information through various electronic devices. For example, the controller 130 may control the display 11 to display the extracted shopping goods information as an image or a text. The controller 130 may receive a touch command through the display 11. When the user touches the image or text corresponding to the shopping goods information displayed on the display 11, the controller 130 may transmit order information of the extracted shopping goods to the server 200 of a pre-registered shopping mall or grocery store, for example. Accordingly, when the shopping goods information is displayed through the display 11, the user may input the touch command to the display 11 and transmit an order command to the server 200 of the shopping mall or grocery store, for example.

Alternatively, the controller 130 may transmit the extracted shopping goods information to the server 200 that is connected to the controller 130 in a wired/wireless communication method. At this time, the user may confirm the shopping goods information stored in the server 200 on a web page linked to the server 200.

For another example, if the shopping goods information is just only stored in the server 200, it may be difficult for the user to order desired goods. Therefore, when the controller 130 receives the order command of the user, the controller 130 may transmit the order information of the extracted shopping goods to the server 200 of the pre-registered shopping mall or grocery store, for example. At this time, the server 200 of the pre-registered shopping mall or grocery store, for example, may deliver shopping goods to the user based on the order information.

Figure 5B:
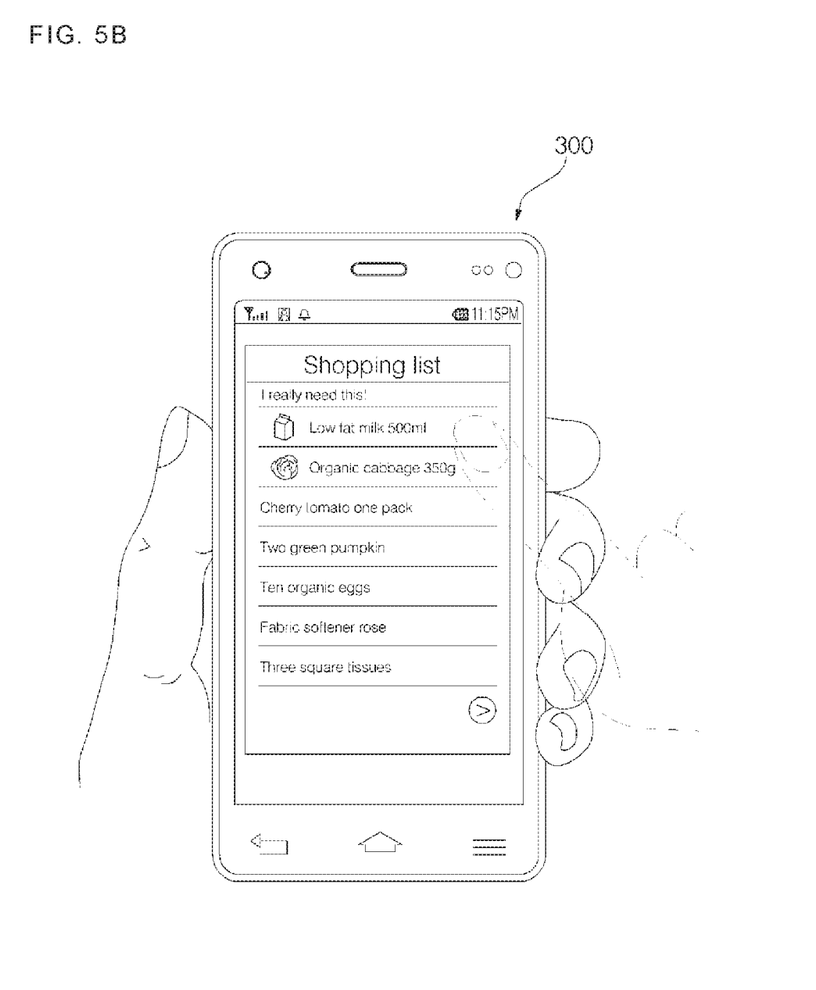
FIG. 5B is an example of an operation of a refrigerator according to an embodiment of the present disclosure.

For another example, as shown in FIG. 5B, the controller 130 may transmit the extracted shopping goods information to the mobile terminal 300 connected to the controller 130 through a wired/wireless communication method. Here, the mobile terminal 300 may be an electronic apparatus which can accomplish the communication of data and voice, taking pictures, shooting videos, voice recording through cameras, playing of music files through a speaker system, outputting of an image or video on the display, and receiving of a multicast signal that provides visual content such as a video or television program, for example. Obviously, the mobile terminal 300 may be provided with a touch screen to provide an input interface between the mobile terminal 300 and a user, and to provide an output interface between the mobile terminal 300 and the user.

To improve the visibility of the user, the controller 130 may transmit a pop-up signal to activate a pop-up window containing the shopping goods information to the mobile terminal 300. The mobile terminal 300 may activate a pop-up window implemented in the form of an image or text containing the shopping goods information according to the pop-up signal. At this time, the pop-up window may be utilized as an interface that receives a user's touch command. That is, when the user touches and selects the shopping goods information on the pop-up window of the mobile terminal, the mobile terminal 300 may transmit the order information for ordering the selected shopping goods to the server 200 of the pre-registered shopping mall or grocery store.

Figure 5C:
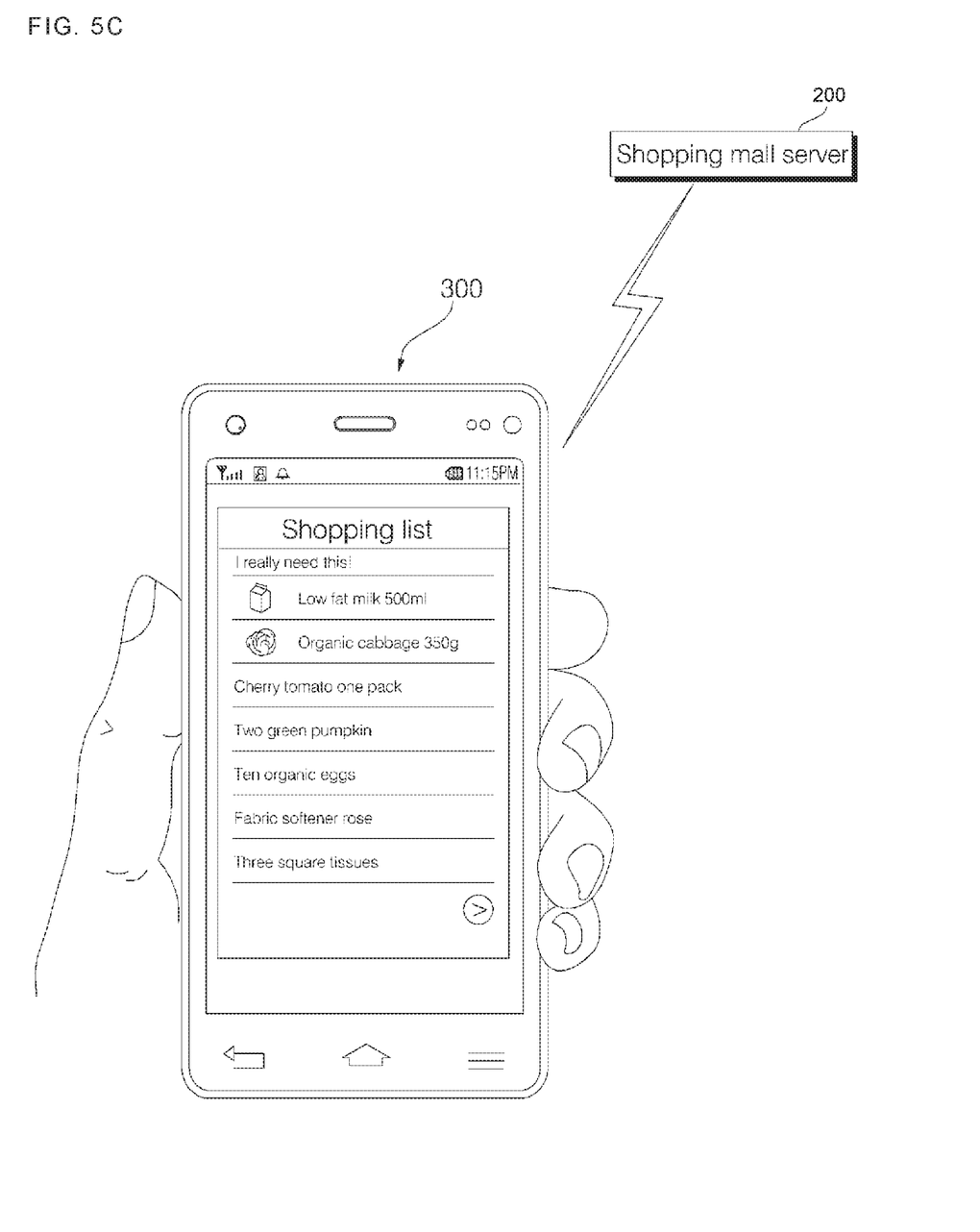
FIG. 5C is an example of an operation of a refrigerator according to an embodiment of the present disclosure.
Figure 6:
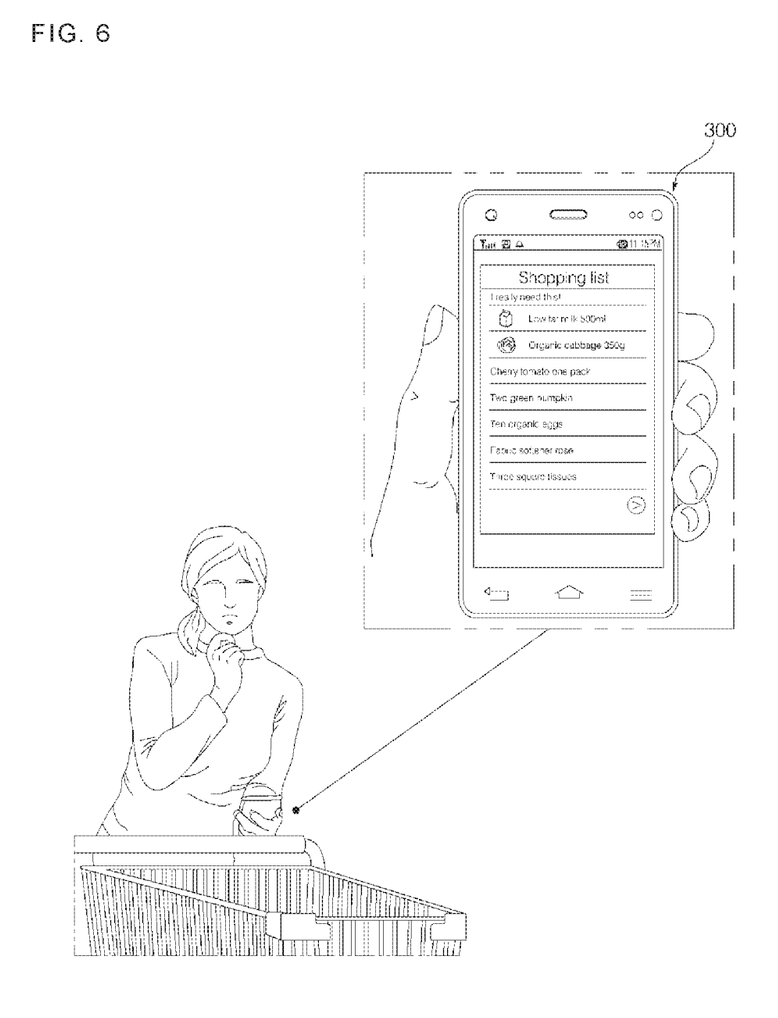
FIG. 6 is an example of an operation of a refrigerator according to another embodiment of the present disclosure.

For another example, as shown in FIG. 5C, the controller 130 may control the activation of the pop-up window containing the shopping goods information according to the location of the mobile terminal 300 connected to the controller 130 in a wired/wireless communication method. Specifically, the controller 130 may receive location information of the mobile terminal 300. If the location of the mobile terminal 300 is located within a preset distance (within a radius of 500 m) from a pre-registered shopping center, the controller 130 may transmit a pop-up signal to activate the pop-up window containing the shopping goods information to the mobile terminal 300. Accordingly, when the user visits the shopping center, the user may automatically receive the information of the shopping goods that need to be purchased through the mobile terminal 300.

In the above, a single user and a single registered mobile terminal 300 are described by way of example. However, when there are a plurality of users and a plurality of registered mobile terminals 300, as will be described later, a user may be specified by voice or video, and the above described shopping goods information may be transmitted to a mobile terminal 300 or a shopping list corresponding to the specified user.

For example, the controller 130 may compare the voice of the pre-registered user with the input voice of the user to specify a user, and transmit the shopping goods information to the shopping list of the specified user. The shopping list may be displayed for each user through the display 11.

For another example, the controller 130 may compare the voice of the pre-registered user with the input voice of the user to specify a user, and transmit the shopping goods information to the mobile terminal 300 of the specified user. Accordingly, when the list of goods that need to be purchased is different for each user, it is possible to provide the shopping goods information to each user.

Unlike the above, the controller 130 may utilize the user's image as a method for specifying a user. The controller 130 may compare the image of the pre-registered user with the extracted image of user to specify a user and transmit the shopping goods information to the mobile terminal 300 of the specified user.

Specifically, a method of specifying a user based on a user's image shall be described below. Referring to FIG. 5A, in detail, the controller 130 may control the camera 110 to photograph the user's image when the door 4 is open. The controller 130 may acquire the image of the user who opens the door 4 by the camera 110. Then, the controller 130 may extract characteristic information of the user from the image of the user extracted by the camera 110.

Here, the characteristic information may be data that identifies a likeness of a user. For example, the characteristic information may include at least one of gender information, age information, and face information of the user. Such characteristic information of user may be stored in the memory 132 of the controller 130 and stored in the server 200. The controller 130 may compare extracted characteristic information with previously stored characteristic information to specify a user. For this purpose, in order to extract the user's image, the camera 110 may use a Haar-based method of combining a Polynomial Support Vector Machine proposed by Papgeorgiou and Poggio, or may use a method of using a chamfer distance between a boundary image and sample database proposed by Gavrila and Philomin, or use a technique such as an extended quasi-Harr wavelet method proposed by Viola.

Figure 7:
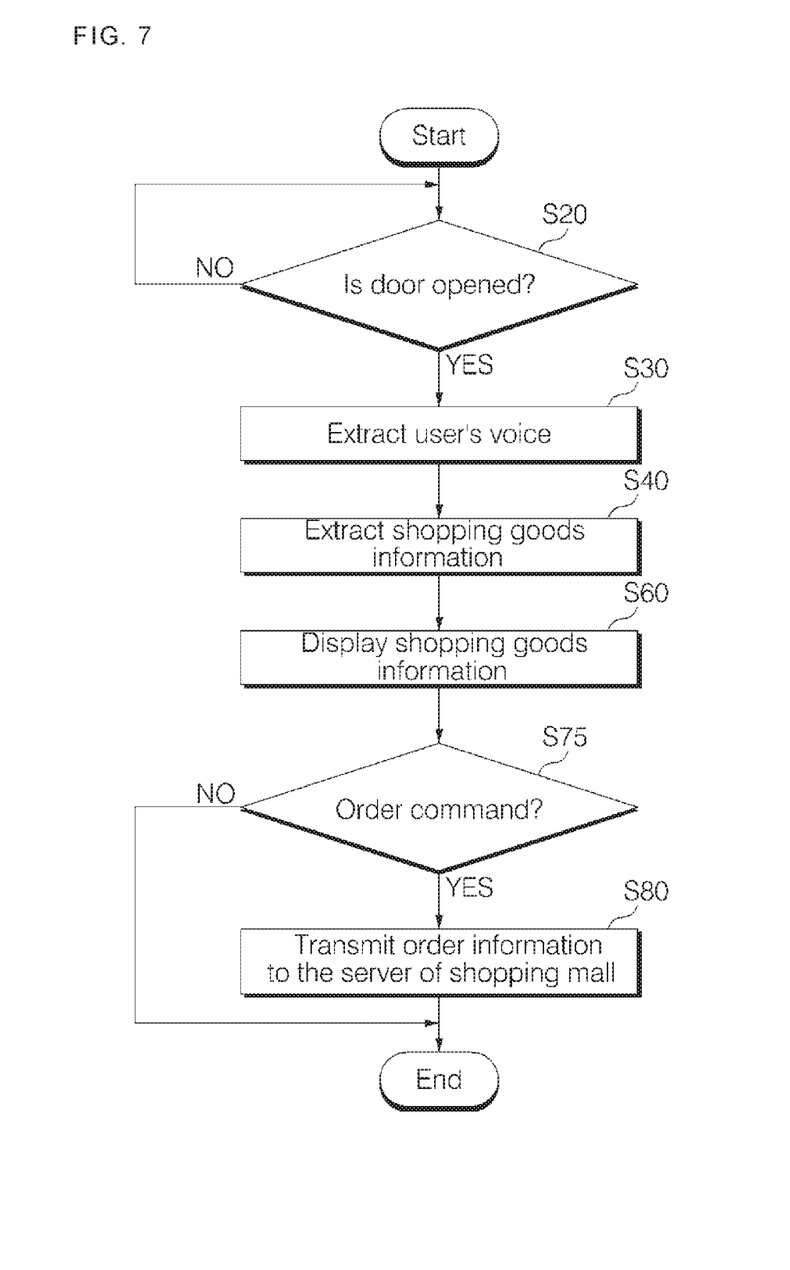
FIG. 7 is a flowchart illustrating a control method of a refrigerator according to an embodiment of the present disclosure.

Referring to FIG. 7, first, in an opening detecting step of the door 4, the controller 130 may determine whether opening of the door 4 is detected (S20). When the door 4 is opened, the controller 130 may extract the user's voice based on the user's voice input through the microphone 120 (S30). Obviously, at this time, the controller 130 may control the speaker 125 to simultaneously output a sound to eliminate noise. In this case, when the door 4 is in the open state, the controller 130 may specify a user based on the user's image input through the camera 110.

Then, the controller 130 may extract the shopping goods information from the extracted user's voice (S40). The controller 130 may store the extracted shopping goods information in the server 200 or the memory. Obviously, the controller 130 may store the extracted shopping goods information in the server 200 of the registered shopping mall or grocery store.

The controller 130 may display the extracted shopping goods information (S60). There may be no limit to the method by which the controller 130 displays the extracted shopping goods information. For example, the controller 130 may display the extracted shopping goods information in the display 11 in the form of an image or a text. Alternatively, the controller 130 may display the extracted shopping goods information on the mobile terminal 300 in the form of an image, a text, and/or a pop-up window.

Then, the controller 130 may determine whether a user's order command is input (S75). The user's order command may be received, as described above, by the user interface, such as the display 11 and/or the touch screen of the mobile terminal 300. The user's order command may be received through the user's voice. The order command may be a command signal of the user who selects at least one of the displayed shopping goods information.

When the user's order command is input, the controller 130 may transmit the order information of the extracted shopping goods to the server 200 of the pre-registered shopping mall (S80). At this time, the server 200 of the pre-registered shopping mall may deliver the shopping goods to the user based on the order information.

Figure 8:
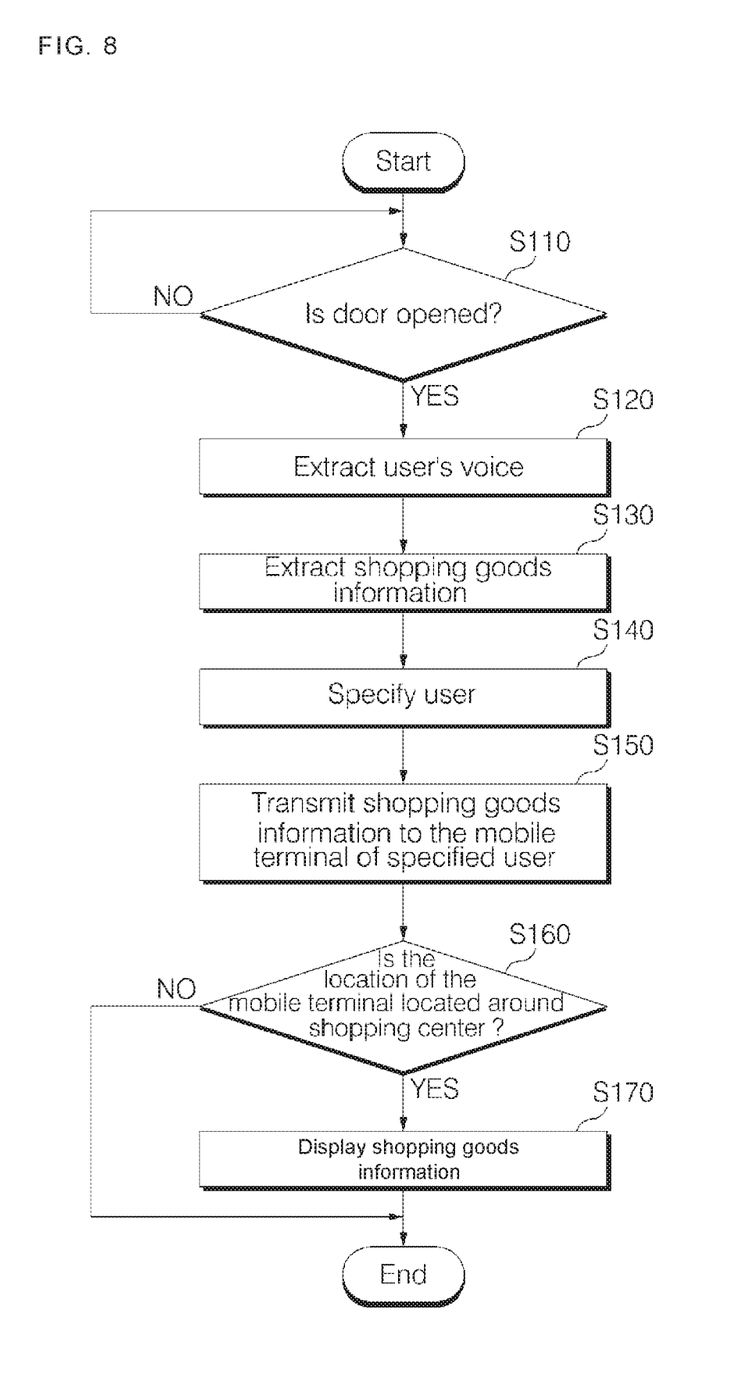
FIG. 8 is a flowchart illustrating a control method of a refrigerator according to another embodiment of the present disclosure.

Referring to FIG. 8, first, in an opening detecting step of the door 4, the controller 130 may determine whether opening of the door 4 is detected (S110). When the door 4 is opened, the controller 130 may extract the user's voice based on the user's voice input through the microphone 120 (S120). At this time, the controller 130 may control the speaker 125 to simultaneously output a sound to eliminate noise. In this case, when the door 4 is in the open state, the controller 130 may specify a user based on the user's image input through the camera 110.

The controller 130 may then extract the shopping goods information from the extracted user's voice (S130). The controller 130 may store the extracted shopping goods information in the server 200 or the memory. The controller 130 may store the extracted shopping goods information in the server 200 of the registered shopping mall or grocery store.

The controller 130 may then specify a user based on the user's voice or image (S140). For example, the controller 130 may specify a user by comparing the voice of a pre-registered user with the input voice of a user, or may specify a user by comparing the image of the pre-registered user with the extracted image of the user.

The controller 130 may transmit shopping goods information to the mobile terminal 300 (pre-registered) of the specified user (S150). Accordingly, when the list of goods that need to be purchased is different for each user, it is possible to provide the shopping goods information to each user.

The controller 130 may receive location information of the mobile terminal 300. If the location of the mobile terminal 300 is located within a preset distance (within a radius of 500 m) from a pre-registered shopping center (S160), the controller 130 may transmit a pop-up signal to activate a pop-up window containing the shopping goods information to the mobile terminal 300 (S170). Accordingly, when the user visits the shopping center, the user may automatically receive the information of the shopping goods that need to be purchased through the mobile terminal 300.

According to the present disclosure, a user may easily store, in a shopping list, goods that need to be purchased among foods stored in the refrigerator by voice recognition. Further, the user may recognize goods that need to be purchased among the foods stored in the refrigerator. In addition, shopping goods information may be provided to the user from around a shopping mall according to the location of the user.

In accordance with an aspect of the present disclosure, a refrigerator may include: a main body including a plurality of storage compartments to store food; a door configured to open and close the main body; a door switch configured to detect an opening and closing of the door; a microphone configured to receive a voice of a user; and a controller configured to recognize the voice of the user input from the microphone and extract shopping goods information, wherein the controller extracts the shopping goods information based on the voice of the user input through the microphone when the door is opened.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a main body including a plurality of storage compartments to store food;
   a door configured to open and close the main body;
   a door switch configured to detect an opening and closing of the door;
   a microphone configured to receive an input voice of a user; and
   a controller configured to recognize the input voice of the user input into the microphone and extract shopping goods information from the input voice, wherein the controller extracts the shopping goods information based on the input voice of the user input through the microphone when the door is opened,
   wherein the controller transmits the extracted shopping goods information to a mobile terminal which is connected to the controller through a wired or wireless communication method,
   wherein the controller transmits a pop-up signal to activate a pop-up window containing the shopping goods information to the mobile terminal when the controller receives location information of the mobile terminal and when the mobile terminal is located within a preset distance from a pre-registered shopping center, and
   wherein the controller compares a voice of a pre-registered user with the input voice of the user, and transmits the shopping goods information to a shopping list of the pre-registered user.

2. The refrigerator of claim 1, further including a display configured to display an image or a text, wherein the controller controls the display to display the extracted shopping goods information in the form of an image or a text.

3. The refrigerator of claim 2, wherein the controller transmits order information of extracted shopping goods to a server of a pre-registered shopping center when an order command of the user is input.

4. The refrigerator of claim 1, wherein the controller transmits the extracted shopping goods information to a server which is connected to the controller through a wired or wireless communication method.

5. The refrigerator of claim 1, wherein the controller transmits a pop-up signal to activate a pop-up window containing the shopping goods information to the mobile terminal.

6. The refrigerator of claim 1, wherein the controller compares a voice of a pre-registered user with the input voice of the user, and transmits the shopping goods information to a mobile terminal of the pre-registered user.

7. The refrigerator of claim 1, further including a camera that extracts an image of the user who opens the door, wherein the controller compares an image of a pre-registered user with an extracted image of the user and transmits the shopping goods information to a shopping list of the pre-registered user.

8. The refrigerator of claim 1, further including a camera that extracts an image of the user who opens the door, wherein the controller compares an image of a pre-registered user with an extracted image of the user and transmits the shopping goods information to a mobile terminal of the pre-registered user.

9. The refrigerator of claim 1, wherein the microphone is provided on a front surface of the main body.

10. The refrigerator of claim 1, wherein the microphone is provided on a side surface of the door.

11. The refrigerator of claim 1, further including a speaker configured to output a certain sound according to a noise signal input from the microphone, wherein the controller transmits a sound source signal to the speaker so as to output a sound having a phase opposite to that of a noise generated around the microphone.

12. The refrigerator of claim 11, wherein the speaker is provided on a side surface of the door.

13. The refrigerator of claim 10, wherein at least two doors are provided on the main body, and a first microphone is provided on a side surface of a first door, and a second microphone is provided on a side surface of a second door, the first and second microphones facing each other.

14. A refrigerator comprising:
- a main body including a plurality of storage compartments to store food;
- a door configured to open and close the main body;
- a door switch configured to detect an opening and closing of the door;
- a microphone configured to receive an input voice of a user; and
- a controller configured to recognize the input voice of the user input into the microphone and extract shopping goods information from the input voice, wherein the controller extracts the shopping goods information based on the input voice of the user input through the microphone when the door is opened, wherein the controller compares a voice of a pre-registered user with the input voice of the user, and transmits the shopping goods information to a shopping list of the pre-registered user.

* * * * *